United States Patent
Phillips et al.

(10) Patent No.: US 9,411,784 B2
(45) Date of Patent: Aug. 9, 2016

(54) METHOD AND COMPUTER READABLE MEDIUM FOR CONTROLLING PAGINATION OF DYNAMIC-LENGTH PRESENTATIONS

(75) Inventors: Matthew J. Phillips, Champaign, IL (US); Gang Xiao, Seattle, WA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 1195 days.

(21) Appl. No.: 13/302,578

(22) Filed: Nov. 22, 2011

(65) Prior Publication Data

US 2015/0199306 A1     Jul. 16, 2015

(51) Int. Cl.
*G06F 17/00* (2006.01)
*G06F 17/21* (2006.01)

(52) U.S. Cl.
CPC .................................. *G06F 17/217* (2013.01)

(58) Field of Classification Search
CPC .... G06F 17/211; G06F 17/212; G06F 17/217
USPC ......... 715/200, 201, 203, 204, 243, 247, 249, 715/251, 252, 273, 276
See application file for complete search history.

(56) References Cited

U.S. PATENT DOCUMENTS

| | | | |
|---|---|---|---|
| 7,150,404 B1* | 12/2006 | Lapstun et al. | 235/487 |
| 2003/0217121 A1* | 11/2003 | Willis | 709/219 |
| 2005/0063010 A1* | 3/2005 | Giannetti | 358/1.18 |
| 2007/0226635 A1* | 9/2007 | Goebel et al. | 715/745 |
| 2009/0044106 A1* | 2/2009 | Berkner et al. | 715/273 |
| 2010/0174985 A1* | 7/2010 | Levy et al. | 715/244 |
| 2011/0082724 A1* | 4/2011 | Le Chevalier et al. | 705/14.4 |
| 2011/0258043 A1* | 10/2011 | Ailaney et al. | 705/14.49 |
| 2012/0284631 A1* | 11/2012 | Lancioni et al. | 715/744 |
| 2012/0311438 A1* | 12/2012 | Cranfill et al. | 715/256 |

* cited by examiner

*Primary Examiner* — Stephen Hong
*Assistant Examiner* — Gregory J Vaughn
(74) *Attorney, Agent, or Firm* — Keller Jolley Preece

(57) ABSTRACT

A method and computer readable medium for defining pagination preferences that control pagination of dynamic-length presentations. In an embodiment, a computer implemented method for specifying pagination preferences comprises, identifying pagination preferences for each page of an original presentation, recording the starting point and ending point within the primary text flow that appear on each page, associating the elements with the page on which the elements are located and storing the pagination preferences, starting and ending points in the primary text flow, and page elements as metadata associated with each page.

20 Claims, 8 Drawing Sheets

METHOD AND COMPUTER READABLE MEDIUM FOR CONTROLLING PAGINATION OF DYNAMIC-LENGTH PRESENTATIONS

BACKGROUND OF THE INVENTION

1. Field of the Invention

Embodiments of the present invention generally relate to displaying presentations on a display device, and, more particularly to a method and computer readable medium for controlling pagination of dynamic-length presentations for display on different sized display devices.

2. Description of the Related Art

With the rapid growth of the Internet, people are moving to viewing documents and presentations online. A typical dynamic-length presentation is a rich, attractive multi-page document such as a magazine or a textbook which is designed on one device, but is read by others on a variety of display devices such as tablet computers, mobile phones, PDAs, laptop computers and the like. It has a dynamic-length because a magazine article may contain a first number of pages when it is displayed on a tablet computer, but may, for example, contain a second different number of pages when it is displayed on a smaller mobile phone or alternatively, may contain a third further different number of pages when it is displayed on a larger laptop computer. Presentations contain a primary text flow which is the text content of the presentation, and also contain a substantive amount of graphic and/or stylized elements which are typically designed on a page-by-page basis. That is, each page has an individual design that is authored with an intended user experience on a specific user device or class of user device. However, due to the unknown size of the display device on which the presentation will be viewed, authors have little control over how a presentation will be presented on another device. From the perspective of an author, such unpredictability or lack of control is highly undesirable for designed presentations due to the potential loss of intended user experience.

One conventional approach to page design uses design templates written in a template language, in a manner similar to web page designs. However, this approach burdens a presentation author to have considerable knowledge of template language. Another conventional approach uses a presentation having fixed size pages, such as PDF (portable document format), which requires an end user viewing the presentation to zoom and pan through a document. In this case the elements of a page that are intended to be viewed in a single view may not be visible, and the user may need to pan the page to view each element individually. Therefore, such an approach may cause inconvenience to the user, and a potentially undesirable loss in the user experience. Another known approach includes designing multiple versions of a presentation to match the anticipated screen sizes of various display devices. However, such an approach significantly increases the burden on the author to anticipate and design for various screen sizes, making the process very tedious.

Thus, conventional approaches are either difficult and/or inefficient to implement. Such approaches do not recognize specific display device characteristics, but rather force-fit a designed page onto a display device, and therefore may be inherently deficient in effectively rendering the presentation.

Therefore, there is a need in the art for a method and computer readable medium to control pagination of dynamic-length presentations.

SUMMARY OF THE INVENTION

Embodiments of the present invention comprise a method and computer readable medium for controlling the pagination of a dynamic-length presentation on a display device. In one embodiment, a computer implemented method for specifying pagination preferences and displaying dynamic-length presentations on a display device comprises identifying the author's pagination preferences for each page of a presentation, recording a start point in the primary text flow and an end point in the primary text flow for each page, associating elements with the page on which the elements reside, storing the pagination preferences, the start point in the primary text flow, the end point in the primary text flow and the elements as metadata associated with each page, determining a number of pages required to display the presentation on the display device, reading the metadata from each page, and until all of the primary text flow has been displayed, iterate through marking a current location in the primary text flow, selecting a page for display based on the metadata, and after adapting the page to the display, filling in the text onto the display device.

Figure 1:
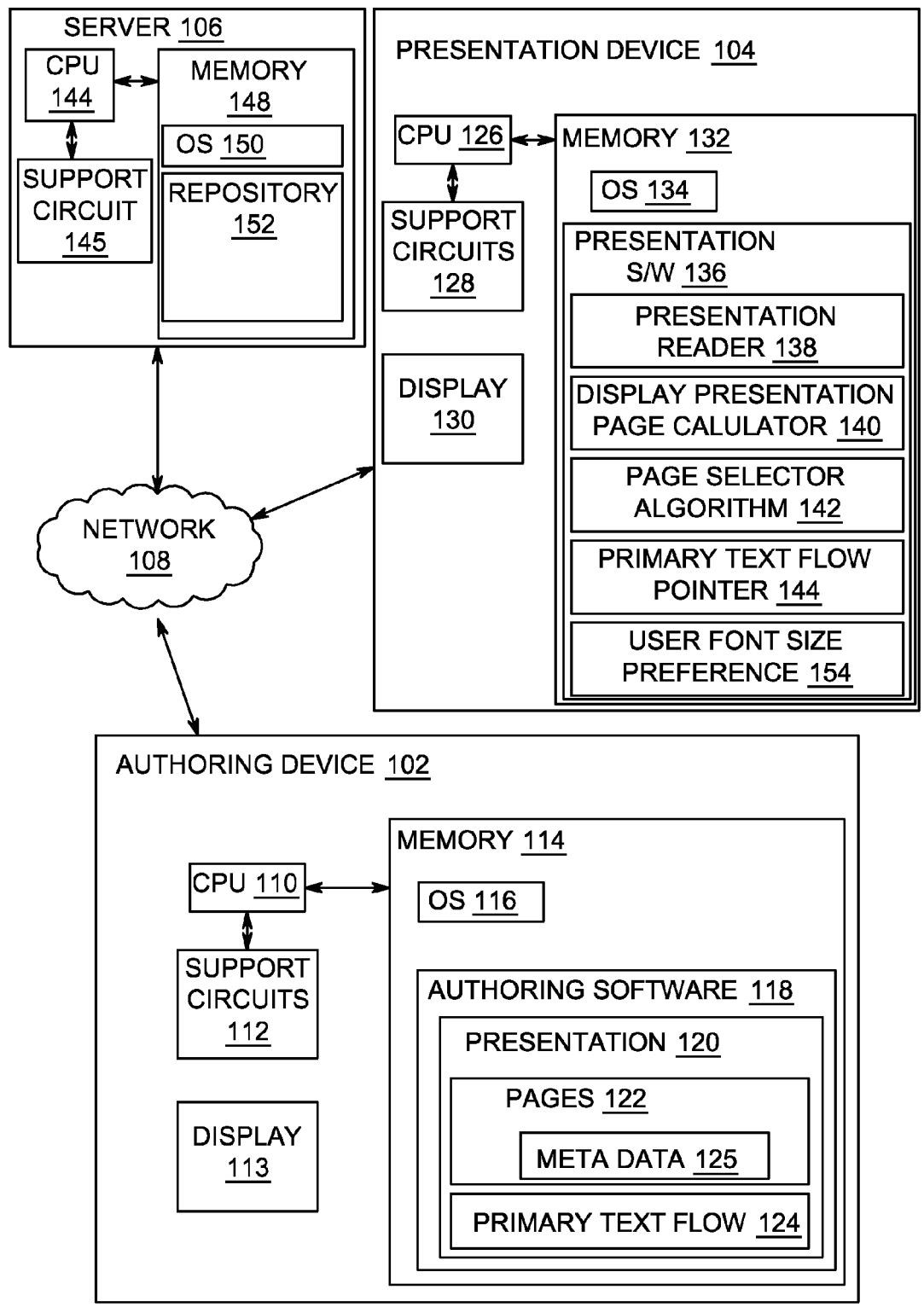
FIG. 1 depicts a block diagram of a computing system for specifying pagination preferences and displaying dynamic-length presentations on a device, according to one or more embodiments of the invention.

While the method and apparatus for controlling pagination of a dynamic-length presentation is described herein by way of example for several embodiments and illustrative drawings, those skilled in the art will recognize that the method and apparatus for controlling pagination of a dynamic-length presentation is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for controlling pagination of a dynamic-length presentation as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and computer readable medium for controlling pagination of a dynamic-length presentation are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention provide a method and computer readable medium for controlling pagination of a dynamic-length presentation on a display device based on the author's pagination preferences. The author designs a presentation, specifying preferences regarding how the presentation is displayed on various display devices where each display device may have a different display size. The pagination control of one embodiment of the invention also takes into consideration user font size preference and display device orientation.

FIG. 1 depicts a computing system 100 for controlling pagination of a dynamic-length presentation, according to at least one embodiment of the invention. The computing system 100 comprises an authoring device 102, a presentation device 104, a server 106 and a network 108. The network 108 communicably couples the authoring device 102, the presentation device 104, and the server 106. The authoring device 102 allows an author of an original presentation to design the original presentation with pagination preferences, while the presentation device 104 is configured to display the presentation based on the pagination preferences provided by the author and run time parameters such as the display size, font size preference, and display device orientation. The pagination preferences may be expressed as a page preference or a document preference, where each page inherits the document preference as a page preference. The server 106 is configured to store metadata encoded presentations and provide access to the stored presentations through the network 108 to connected devices, such as the presentation device 104.

The authoring device 102 is a type of computing device (e.g., a laptop, a desktop, a Personal Digital Assistant (PDA), a tablet, a mobile phone and/or the like) known to one of ordinary skill in the art. The authoring device 102 comprises a Central Processing Unit (CPU) 110, support circuits 112, a display 113 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The display 113 comprises one or more known display screens such as LCD, LED, AMOLED that display digital information graphically, for example, the presentation 120. The memory 114 comprises at least one of Read Only Memory (ROM), Random Access Memory (RAM), disk drive storage, optical storage, removable storage and/or the like. The memory 114 comprises an operating system (OS) 116, and an authoring software 118.

The authoring software 118, for example, InDesign® available from Adobe Systems Incorporated, is configured to receive a presentation 120 having one or more pages 122, and a primary text flow 124. Pages 122 are comprised of elements such as headers, footers, illustrations, side bars, pull quotes, images, and the like. The primary text flow 124 is the text of the document which flows through the presentation 120 when it is displayed. The presentation is originally designed for the author's display 113. The authoring software 118, also records the starting point and ending point within the primary text flow 124 that appear on each page at design time, associates elements of each page to the text at the start of that page at design time, and then generates metadata 125 associated with each of the pages 122. The metadata 125 controls pagination of the presentation on display devices of various sizes. Thus, on the authoring side, the authoring software 118 translates each presentation page into a template which includes the metadata 125 for that page 122.

The presentation device 104 is a type of computing device (e.g., a laptop, a desktop, a Personal Digital Assistant (PDA), a tablet, a mobile phone and/or the like) known to one of ordinary skill in the art. The presentation device 104 comprises a Central Processing Unit (CPU) 126, support circuits 128, a display 130 and a memory 132. The CPU 126 may comprise one or more commercially available microprocessors or microcontrollers that facilitate data processing and storage. The various support circuits 128 facilitate the operation of the CPU 126 and include one or more clock circuits, power supplies, cache, input/output circuits, and the like. The display 130 comprises one or more known display screens such as LCD, LED, AMOLED that display digital information graphically, for example, the presentation 120. In the illustrated embodiment, the size of the display 130 of the presentation device 104 is different from the size of the display 113 of the authoring device 102. The memory 132 comprises at least one of Read Only Memory (ROM), Random Access Memory (RAM), disk drive storage, optical storage, removable storage and/or the like. The memory 132 comprises an operating system (OS) 134, and a presentation software 136.

The presentation software 136 is configured to paginate and display a presentation 120 based on pagination preferences including the metadata 125, size of the display device, and user preferences such as user font size preference 154 and page orientation. The presentation software 136 comprises a presentation reader 138, a display presentation page calculator 140, a page selector algorithm 142, and a primary text flow pointer 144. The presentation reader 138 is configured to read the metadata 125 associated with each of the pages 122 of a presentation. The display presentation page calculator 140 uses the display device size, the user font size preference 154 and the display device orientation to determine the number of pages that will be required to render a presentation on the display 130. After marking a current location in the primary text flow using the primary text flow pointer 144, the presentation software 136 uses the page selector algorithm 142 to select a page to be displayed on the display 130. A page adaptation scheme adapts the selected page to the display 130, and using the primary flow text pointer to determine the current location in the primary text flow, supplies the text in the font size specified by the user, to fill up a text region available on the displayed page based on the user font size preference 154. The primary text flow pointer 144 is reconfigured to mark a new current location of the primary text flow where the primary text flow ended when filling up the text region on the page. If there is more primary text flow to be displayed, the presentation software 136 iterates the process of selecting a new page to be displayed, adapting the page and filling in the text until all of the primary text flow has been displayed. Thus the presentation software 136 displays each page of the presentation based on the pagination preferences specified by the author.

The server 106 is a type of computing device (e.g., a laptop, a desktop, a Personal Digital Assistant (PDA), a tablet, a mobile phone and/or the like) known to one of ordinary skill in the art. The server 106 comprises a Central Processing Unit (CPU) 144, support circuits 146, and a memory 148. The CPU 144 may comprise one or more commercially available microprocessors or microcontrollers that facilitate data processing and storage. The various support circuits 146 facilitate the operation of the CPU 144 and include one or more clock circuits, power supplies, cache, input/output circuits, and the like. The memory 148 comprises at least one of Read Only Memory (ROM), Random Access Memory (RAM), disk drive storage, optical storage, removable storage and/or the like. The memory 148 comprises an operating system (OS) 150, and a repository 152. In one or more embodiments, the presentation 120 from the authoring device 102 is stored on the server 106. In some embodiments, the server and the authoring device may be the same device.

The network 108 is any network generally known in the art, for example, the Internet, that allows for communicating the presentation 120 from the authoring device 102 to the presentation device 104. The presentation 120 may be delivered to the presentation device 104 via alternate means, such as memory sticks, local wireless networks, among several other generally known modes of communicating data.

According to various embodiments, of the computing system 100, the presentation 120 comprises pages 122 having various elements such as headers, footers, illustrations, side bars, pull quotes, and images, a primary text flow 124, and metadata 125 that captures an author's design preferences, pagination preferences, and association of elements on a page to the start of the primary text flow on that page. For example, such a presentation 120 having metadata 125 is created using commercial software, such as InDesign® available from Adobe Systems Incorporated. The presentation 120 is rendered on the display 130, by paginating the presentation based on the metadata 125 and user preferences such as font size and page orientation. Therefore, the embodiments disclosed herein advantageously satisfy an author's goals of being able to preserve an intended user experience, with minimal complexity at design time, and having control over the process of pagination for display devices of unknown size, in a reasonably predictable manner.

Figure 2:
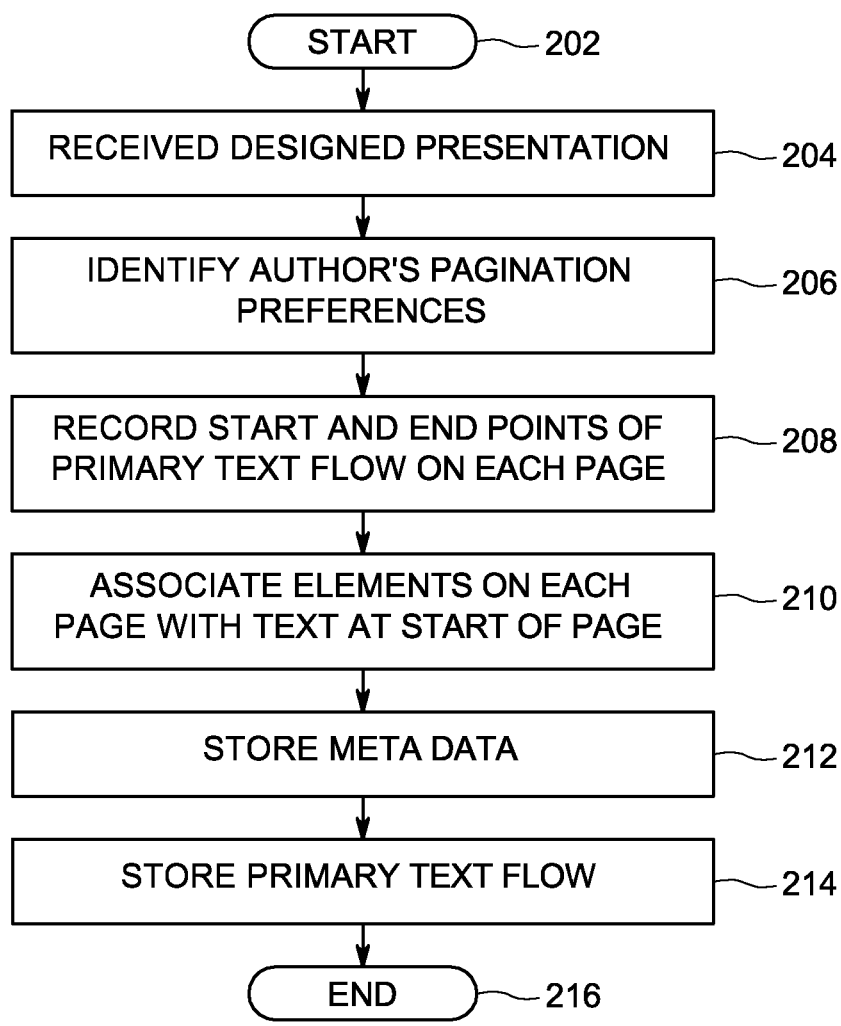
FIG. 2 depicts a flow diagram of a method for defining pagination preferences for controlling pagination as performed by the authoring software of FIG. 1, according to one or more embodiments of the invention.

FIG. 2 depicts a flow diagram of a method 200 illustrating the operation of the authoring software 118 of FIG. 1, according to one or more embodiments of the invention. The method 200 represents execution of the authoring software 118 using the authoring device 102 or a computer of FIG. 8, according to another embodiment of the invention. The method 200, according to one embodiment, generates metadata based an author's pagination preferences and stores the metadata with each page of the presentation and stores the primary text flow.

The method 200 starts at step 202 and proceeds to step 204. At step 204, the method 200 receives an original presentation 120 comprising one or more pages. The presentation includes a primary text flow, and one or more pages 122.

At step 206, the method 200 identifies pagination preferences provided by the author for each page of the presentation. These preferences may be set at a document level and propagated to each page as a page preference or may be individually set for each page. According to one embodiment, the pagination preferences include designating a page as one of: a fixed page, a movable page, an optional page or an expansion page. A fixed page has a fixed position within the presentation, and it is intended that when displayed, the position of the fixed page is preserved in the displayed presentation. A movable page may be moved up or down the order within the presentation when it is displayed. For example, a movable page may have been the fifth page in the original presentation, but if necessary, may be moved to perhaps, page three or page six in the displayed presentation. An optional page has content that may be removed from the presentation. In certain embodiments, an optional page will be removed from the presentation if the presentation is being displayed on a device with a larger display and therefore can be rendered on fewer pages. For example, if an original presentation was designed with five pages, and the displayed presentation can be rendered on four pages, the optional page (and the elements associated with that page) will not be displayed. An expansion page provides a template for inserted pages which are added to the original presentation in order to accommodate the primary text flow of the presentation. According to certain embodiments, pagination preferences include specifying that two or more pages may not be separated when displayed. For example, if pages are designed with content that is intended to be displayed in succession, then such pages must not be separated when being displayed. According to certain other embodiments, pagination preferences include defining a page by relative position within the presentation. For example, a page may be designated as "last" and will be displayed as the last page of the presentation regardless of the length of the displayed presentation.

At step 208, the method 200 records a starting point within the primary text flow that points to the location of the first word that appears on a page in the original presentation and an ending point within the primary text flow that points to the location after the last word that appears on a page in the original presentation, and at step 210, the method 200 associates the elements on each page with that page. In one embodiment, the elements on a page are associated with the starting point, for example a pointer to the first word in the primary text flow on that page at design time. In various embodiments, the text on a design page is relevant to the elements on that page, and when the presentation is paginated for display, the relative distance or positioning may determine whether displaying the associated text and the elements is acceptable or unacceptable according to intended design preferences. At step 212, the method 200 stores all the pagination preference information received at the steps 204, 206, 208 and 210 for each page as metadata associated with that particular page of the presentation. At step 214, the method 200 stores the primary text flow of the original presentation. The method 200 ends at step 214.

Thus, the method 200 transforms the original presentation into a presentation that includes the author's pagination preferences as metadata. The metadata associated with the pages of the original presentation is usable for paginating the presentation, with more or fewer pages, according to different display sizes. The controlled pagination maintains consistency with the author's intended design preferences in a reasonably predictable manner.

Figure 3:
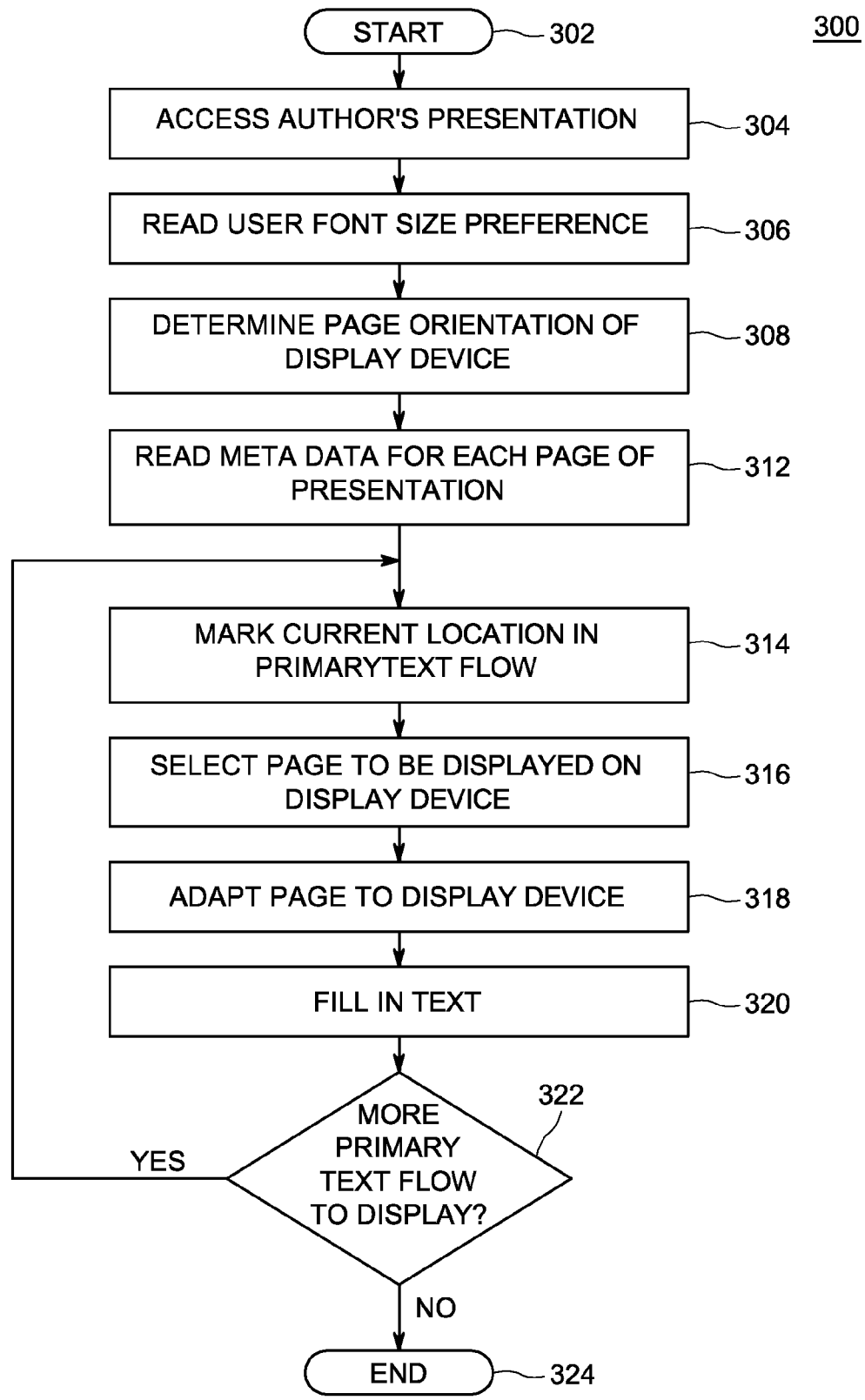
FIG. 3 depicts a flow diagram of a method for displaying paginated presentations as performed by the presentation software of FIG. 1, according to one or more embodiments of the invention.

FIG. 3 depicts a flow diagram of a method 300 illustrating operation of the presentation software 136 of FIG. 1, according to one or more embodiments. The method 300 represents execution of the presentation software 136 using the presentation device 104 of FIG. 1, or the computer of FIG. 8, according to one embodiment of the invention. The method 300, according to one embodiment, displays a dynamic-length presentation on a display device based on pagination preferences stored in pages of a presentation, display device characteristics, such as the display size, and user preferences, such as the font size and page orientation.

The method 300 starts at step 302, and proceeds to step 304. At step 304, the method 300 accesses an original presentation comprising at least one page and a primary text flow. The method 300 accesses the presentation authored using the method 200 of FIG. 2. At step 306, the method 300 reads the user font size preference and proceeds to step 308. At step 308, the method 300 determines the page orientation of the display device and proceeds to step 312. At step 312, the method 300 reads the metadata for each page of the presentation. Metadata associated with each page comprises pagination preferences provided by the author of the original presentation. The method 300 uses the available information to create a paginated presentation in the manner described below.

At step 314, the method 300 marks a current location in the primary text flow. At step 316, the method 300 selects a page from the presentation to be displayed for a current location of the primary text flow, based on pagination preferences read from the metadata. The metadata defines a role for each page of the presentation. The roles are designated to a page based on whether a page is a fixed page, a movable page, an optional page or an expansion page. According to one embodiment, each page defines one or more elements to be displayed on the paginated page on the display device. At step 318, the method 300 adapts the selected page for the display device. The page adaptation scheme is used for adjusting the geometry of the selected page to adapt to the display device. For example, the adaptation scheme may scale or format the elements, among other operations. Further, adapting the selected page to the display size creates a text region on the selected page where the primary text will be displayed.

At step 320, the method 300 fills the text region of the selected page with the available primary text flow. At step 322, the method determines whether more of the primary text flow exists to be displayed. If a determination is made that additional text flow exists, the method 300 proceeds to the step 314 and marks a new position in the primary text flow to indicate text that follows the primary text flow used to fill the selected page at the step 320. The method 300 iterates in this manner until all of the primary text flow has been displayed. If a determination is made that no additional text exists for being displayed, the method 300 proceed to, and ends at step 324.

Therefore, the method 300 uses the pagination preferences received with a presentation, the display size and user preferences such as font size and page orientation to display the presentation having more or fewer pages. The method 300 preserves an intended user experience of the presentation in a reasonably predictable manner as specified by the author.

Figure 4:
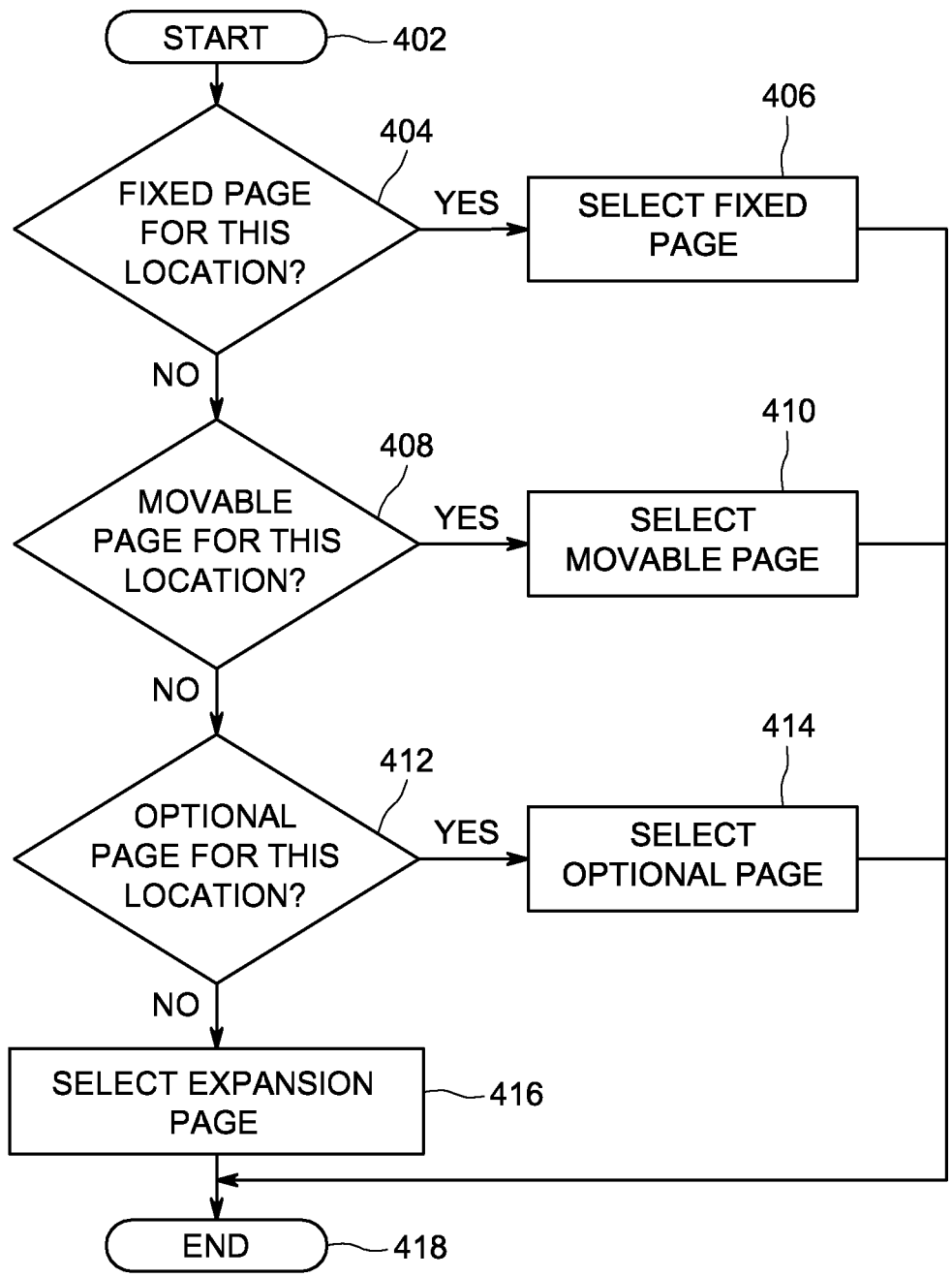
FIG. 4 depicts a flow diagram of a method for selecting a page to be displayed within the method of FIG. 3, according to one or more embodiments of the invention.

FIG. 4 depicts a flow diagram of a method 400 illustrating operation of the page selector algorithm 142 of FIG. 1, according to one or more embodiments. The method 400, according to one embodiment, selects a page from the original presentation to be displayed on a display device, further detailing step 316 of FIG. 3.

The method 400 starts at step 402, and proceeds to step 404. At step 404, the method 400 determines whether a fixed page from the original presentation is defined for being displayed at the current location of the displayed presentation. If a fixed page for the current location exists, the method proceeds to step 406. At step 406, the method selects the fixed page for display, and the method 400 proceeds to step 418. If at step 404, the method 400 determines that a fixed page does not exist for the current location of the displayed presentation, the method 400 proceeds to step 408.

At step 408, the method 400 determines whether a movable page can be placed at the current location of the displayed presentation. If a movable page can be placed at the current location, the method proceeds to step 410. At step 410, the method selects the movable page for display, and the method 400 proceeds to step 418. If at step 408, the method 400 determines that a movable page may not be placed at the current location of the displayed presentation, the method 400 proceeds to step 412.

At step 412, the method 400 determines whether an optional page can be placed at the current location of the displayed presentation. If an optional page can be placed at the current location, the method proceeds to step 414. At step 414, the method selects the optional page for display, and the method 400 proceeds to step 418. If at step 412, the method 400 determines that an optional page may not be placed at the current location, the method 400 proceeds to step 416. At step 416, the method selects an expansion page for display, and proceeds to step 418. The method ends at step 418. According to an embodiment in which the number of pages required on a display device a greater than the number of pages in the original presentation, an expansion is selected if the method 400 fails to find a fixed page, a movable or an optional page for display at the current location. The method 400 uses the pagination preferences to prioritize the selection of various pages from the original presentation for being displayed at the current location of the displayed presentation.

Figure 5:
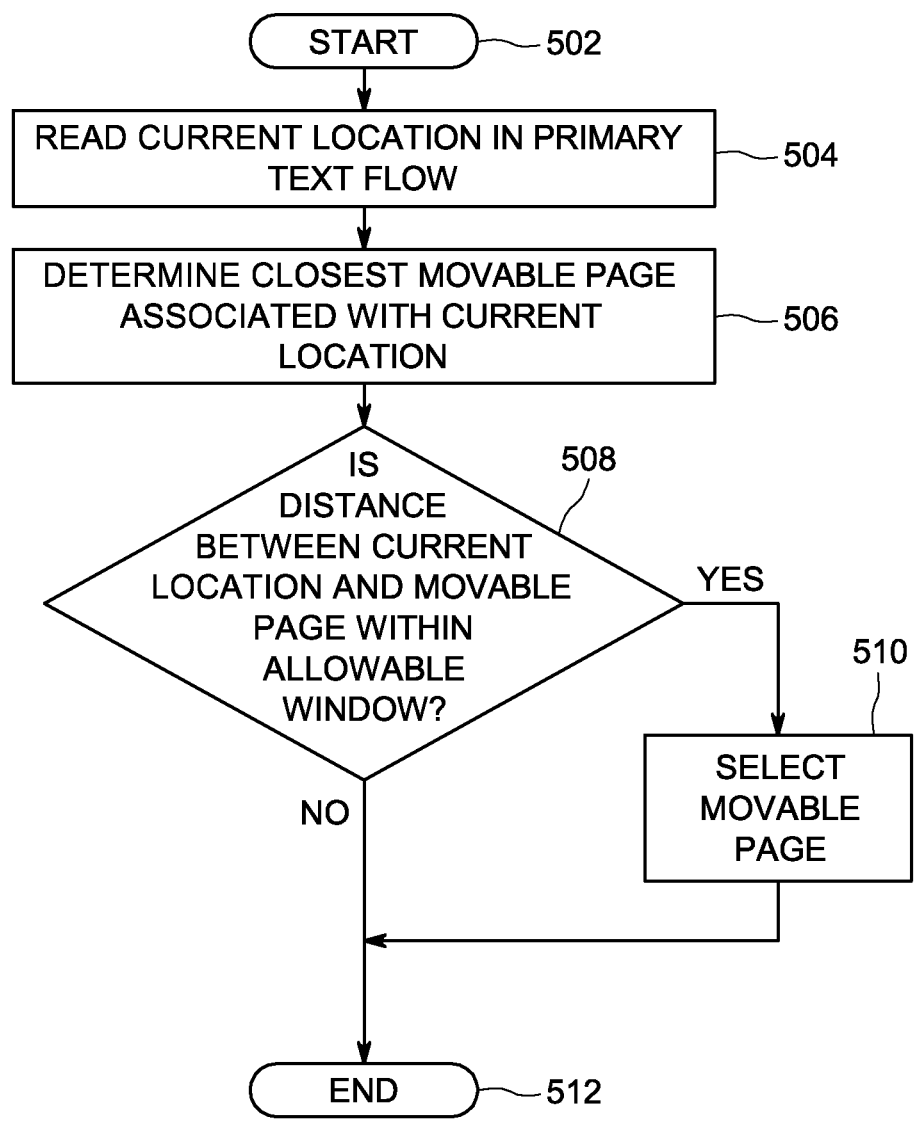
FIG. 5 depicts a flow diagram of a method for determining whether a movable page should be displayed within the method of FIG. 4, according to one or more embodiments of the invention.

FIG. 5 depicts a flow diagram of a method 500 to further illustrate step 408 of FIG. 4, according to one or more embodiments. The method 500, according to one embodiment, determines whether a movable page should be displayed at a current location of the displayed presentation. The method 500 starts at step 502, and proceeds to step 504. At step 504, the method 500 reads the current location in the primary text flow. At step 506, the method 500 determines whether there are any movable pages bound to the text that are within a predefined, forward looking window (a length of text) or that the text has already been passed. At step 508, the method 500 determines whether the distance between the closest movable page and the current location in the text flow is within the window. The window may be set, for example, according to the author's preference or set as a standard parameter. If at step 508, the method determines that a movable page exists within the window, the method 500 proceeds to step 510. At step 510, the method selects the movable page for display, and the method 500 proceeds to step 512. If at step 508, the method 500 determines that a movable does not exist within the predefined window, the method proceeds to, and ends at step 512.

Figure 6:
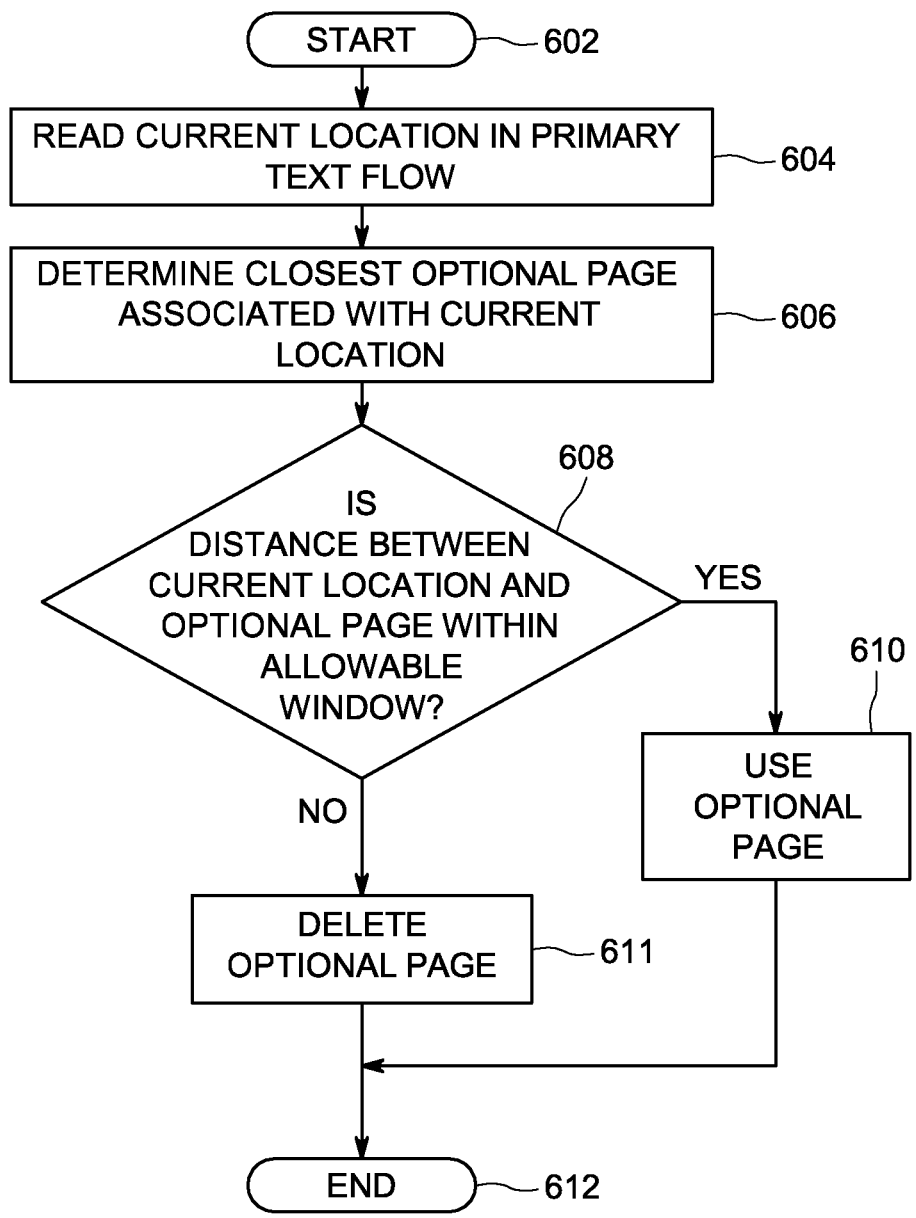
FIG. 6 depicts a flow diagram of a method for determining whether an optional page should be displayed within the method of FIG. 4, according to one or more embodiments of the invention.

FIG. 6 depicts a flow diagram of a method 600 to further illustrate step 412 of FIG. 4, according to one or more embodiments. The method 600, according to one embodiment, determines if an optional page should be displayed at a current location of the displayed presentation. The method 600 starts at step 602, and proceeds to step 604. At step 604, the method 600 reads the current location in the primary text flow. At step 606, the method 600 determines the closest optional page associated with the current location in the primary text flow. At step 608, the method 600 determines whether the distance between the closest optional page and the current location in the text flow is within a predefined window (a length of text). The predefined window may be set, for example, according to the author's preference or be a standard parameter. If at step 608, the method determines that an optional page exists within the window, the method 600 proceeds to step 610. At step 610, the method selects the optional page for display, and the method 600 proceeds to step 612. If at step 608, the method 600 determines that an optional page does not exist within the window, the method proceeds to step 611, and the optional page is deleted (dropped). The method 600 ends at step 612.

Figure 7:
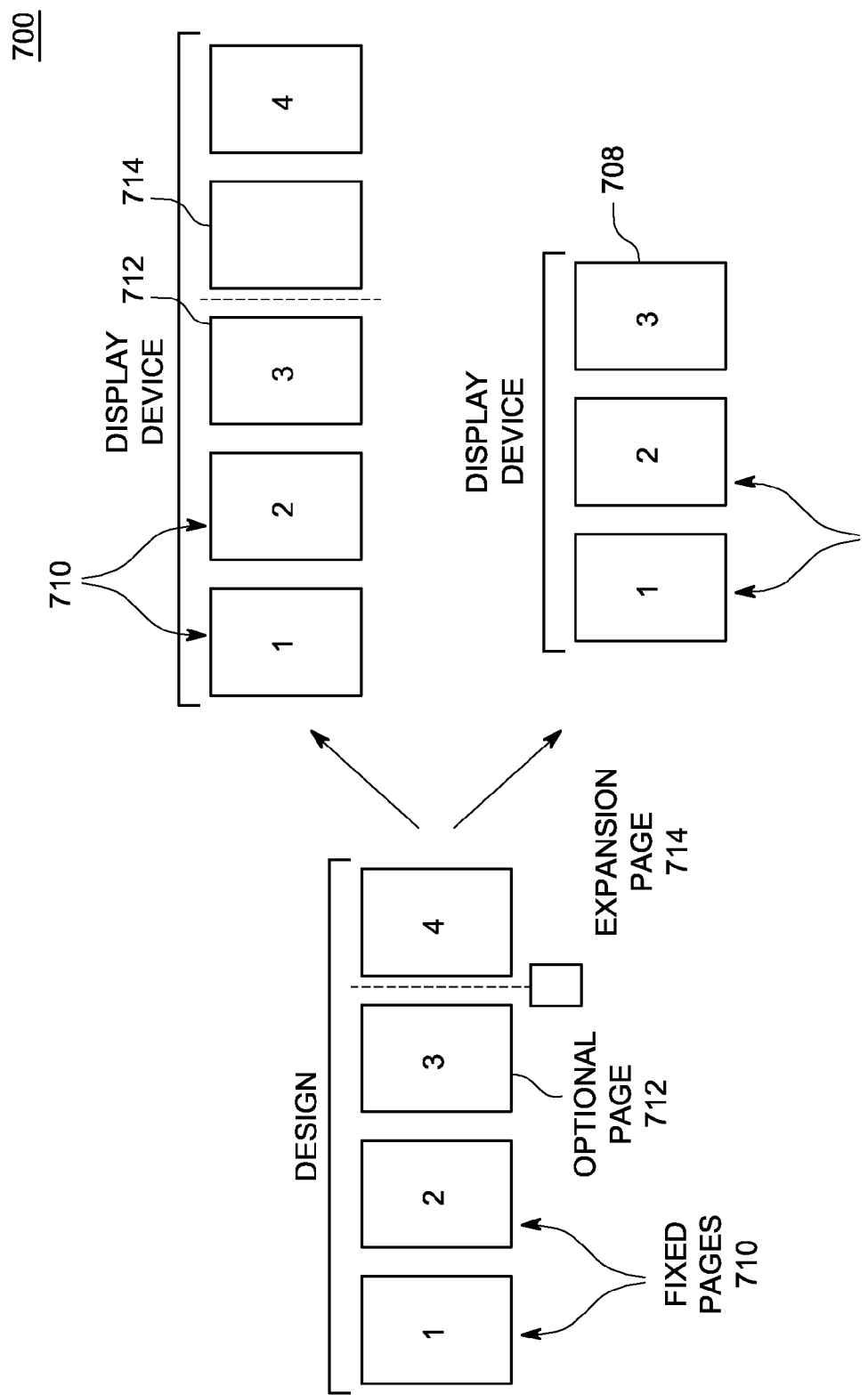
FIG. 7 depicts a schematic representation illustrating paginated presentation for display devices with smaller and larger display sizes as compared to size of the presentation when authored using the method of FIG. 2 and displayed using the method of FIG. 3, according to one or more embodiments of the invention.

FIG. 7 depicts a schematic 700 illustrating paginated presentations for display devices with smaller and larger display sizes as compared to author's display 113 of the presentation, according to one or more embodiments. The schematic 700 illustrates an original presentation 702, having page 1 and page 2 designated as fixed pages 710, page 3 designed as an optional page 712, page 4 designated as the last page of the presentation, and an expansion page 714 available for insertion as needed. The page size of the original presentation 702 is referred to as the design size. According to various embodiments discussed herein, the original presentation 702 is paginated for different display sizes. For example, for a device smaller than the design size, the original presentation 702 is paginated to a longer paginated presentation 704 having more pages than the original presentation 702. For a display device that is larger than the design size, the original presentation 702 is paginated to a shorter displayed presentation 708 having fewer pages than the original presentation 702. When paginated for a display device which is the same size as the design size, the original presentation 702, paginated based on the user font size preference and the display device orientation, may be shorter, the same length, or longer when displayed, depending on these factors.

Pagination onto a smaller display device results in a displayed presentation 704 comprising more pages than the original presentation. The display presentation page calculator determines that based on the display device size, user font size preference, and display device orientation, that the original presentation 702 comprising four pages will require five pages for display. Page 1 is designated as a fixed page. As such, page 1 of the original presentation must be used as page 1 on the display device. Page 1 will be adapted to the display device and the primary text flow will be used to fill in the available text region. Note that because the display device is smaller than the design size, less text will fit on page 1 of the displayed presentation than fit on page 1 of the original presentation. Next, a page is needed to display as page 2 on the display device. Page 2 of the original presentation is designated as fixed and will remain page 2 in the displayed presentation. Again, page 2 will be adapted to the display device and the primary text flow will be displayed in the available text region. Next, a page is needed to display as the third page on the display device. The available choices are page 3 and page 4 of the original presentation. Page 4 is designated as the last page; therefore, it cannot be used. Page 3 will be selected and adapted to the display device and then the text region will be filled the primary text flow. The remaining page, page 4 is designated as the last page. This displayed presentation contains five pages; therefore page 4 cannot be used and an expansion page must be displayed to fill in the page in the display so page 4 can finally be displayed as the last page.

Pagination onto a larger display device results in a displayed presentation 704 comprising fewer pages than the original presentation. The display presentation page calculator calculates that based on the display device size, user font size preference, and display device orientation, that the original presentation 702 comprising four pages will require three pages for display. Page 1 and page 2 are fixed pages and will remain page 1 and page 2 in the displayed presentation as above. As page 3 is designated as optional and the presentation only requires three pages to display, this page (page 3 of the original presentation) will not be selected for display in the displayed presentation and page 4 will be displayed as the last page.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a non-transient computer-usable or computer-readable storage medium having computer-usable or computer-readable program code embodied in the medium for use by or in connection with an instruction execution system. In the context of this document, a computer-usable or computer-readable medium may be any non-transient medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java.®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 8:
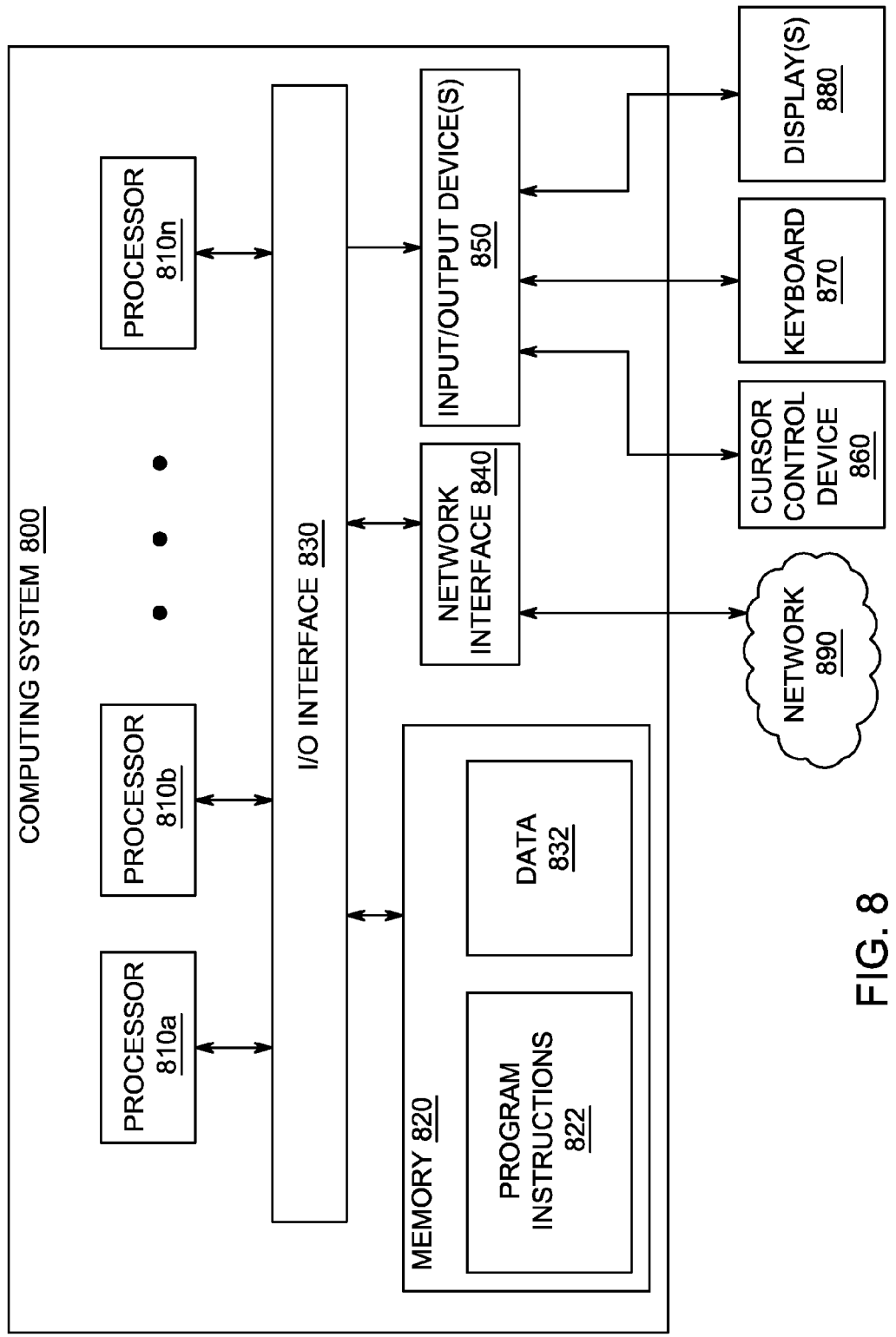
FIG. 8 depicts a computer system that can be used to implement the methods of FIGS. 2 and 3 in various embodiments of the present invention, according to one or more embodiments of the invention.

FIG. 8 depicts a computer system that can be utilized in various embodiments of the present invention, according to one or more embodiments.

Various embodiments of a method and apparatus for controlling pagination of a dynamic length presentation, as described herein, may be executed on one or more computer systems, which may interact with various other devices. One such computer system is computer system 800 illustrated by FIG. 8, which may in various embodiments implement any of the elements or functionality illustrated in FIGS. 1-7. In various embodiments, computer system 800 may be configured to implement methods described above. While the illustrated system demonstrates computer system 800 implementing method 200, computer system 800 may be used to implement any other system, device, element, functionality or method of the above-described embodiments. In the illustrated embodiments, computer system 800 may be configured to implement methods 200, 300, 400, 500, and 600 as processor-executable executable program instructions 822 (e.g., program instructions executable by processor(s) 810) in various embodiments.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In various embodiments, any of components may be utilized by the system to receive user input described above. In various embodiments, a user interface (e.g., user interface) may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x96, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of non-transient computer-readable media or on similar media separate from system memory 820 or computer system 800.

In one embodiment, I/O interface 830 may be configured to coordinate I/O traffic between processor 810 , system memory 820, and any peripheral devices in the device, including network interface 840 or other peripheral interfaces, such as input/output devices 850, In some embodiments, I/O interface 830 may perform any necessary protocol, timing or other data transformations to convert data signals from one components (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the methods described above, such as the methods illustrated by the flowcharts of FIGS. 2-6. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The present invention offers various advantages by enabling pagination of dynamic-length presentation for different display devices. It provides the author of the original presentation control over the pagination process on different devices having varied display sizes in a predictable manner, while ensuring a reasonably high quality user experience. Furthermore, the various embodiments disclosed herein overcome several disadvantages of the conventional approaches. For example, the present embodiments do not require the author to understand a template language, but rather automatically generate the template information for the presentation. The present embodiments provide a simple and effective scheme for controlling pagination, and enable an author to create highly-designed presentations that paginate predictably on different display devices. The present embodiments also prevent costs and time associated with template construction, or with redesign of the presentation for various display sizes.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of defining pagination preferences to control pagination of dynamic-length presentations comprising:
identifying pagination preferences for each page of an original presentation, where the original presentation comprises a design for at least one page of the original presentation, the design comprising: (i) a primary text flow, and (ii) at least one element separate from the primary text flow for display on the at least one page;

identifying, for the at least one page of the original presentation, a starting point and an ending point within the primary text flow;

associating the at least one element with the starting point of the at least one page on which the at least one element is located in the original presentation based on metadata for the at least one page;

determining that display of the original presentation on a display device requires different pagination than display of the original presentation during authoring of the original presentation;

determining that the at least one element belongs with the starting point of the primary text flow on a first page on the display device based on the metadata; and displaying, on a display device, the at least one element with the starting point of the primary text flow on the first page and at least part of the primary text flow on a second page on the display device.

2. The method of claim 1 wherein identifying pagination preferences comprises selecting a role for each page from a group consisting of a fixed page, a movable page, an optional page and an expansion page.

3. The method of claim 2 wherein identifying preferences further comprises defining a fixed page by relative position within the original presentation.

4. The method of claim 1 wherein identifying preferences further comprises specifying a plurality of pages of the original presentation that are not to be separated during pagination or during display on the display device.

5. The method of claim 1 wherein associating the at least one element comprises recording a location of a first word in the primary text flow for a page on which the at least one element resides in the original presentation.

6. The method of claim 1, wherein the original presentation comprises a plurality of pages, the pages comprising metadata for controlling pagination of the original presentation on a display device of unknown size.

7. In a digital medium environment for defining pagination preferences to control pagination of dynamic-length presentations, a system comprising:

at least one processor; and at least one non-transitory computer-readable storage medium storing instructions thereon that, when executed by the at least one processor, cause the system to:

identify pagination preferences for each page of an original presentation, where the original presentation comprises a design for at least one page of the original presentation, the design comprising: (i) a primary text flow, and (ii) at least one element separate from the primary text flow for display on the at least one page;

identify, for the at least one page of the original presentation, a starting point and an ending point within the primary text flow;

associate the at least one element with the starting point of the at least one page on which the at least one element is located in the original presentation based on metadata for the at least one page;

determine that display of the original presentation on a display device requires different pagination than display of the original presentation during authoring of the original presentation;

determine that the at least one element belongs with the starting point of the primary text flow on a first page on the display device based on the metadata; and display, on a display device, the at least one element with the starting point of the primary text flow on the first page and at least part of the primary text flow on a second page on the display device.

8. The system of claim 7, wherein identifying pagination preferences comprises selecting a role for each page from a group consisting of a fixed page, a movable page, an optional page and an expansion page.

9. The system of claim 8, wherein identifying preferences further comprises defining a fixed page by relative position within the original presentation.

10. The system of claim 7, wherein identifying preferences further comprises specifying a plurality of pages of the original presentation that are not to be separated during pagination or during display on the display device.

11. The system of claim 7, wherein associating the at least one element comprises recording a location of a first word in the primary text flow for a page on which the at least one element resides in the original presentation.

12. The system of claim 7, wherein the original presentation comprises a plurality of pages, the pages comprising metadata for controlling pagination of the original presentation on a display device of unknown size.

13. The system of claim 7, further comprising instructions that, when executed by the at least one processor, cause the system to:

calculate a plurality of pages on the display device required to display the primary text flow and the at least one element; and display the primary text flow and the at least one element on the calculated plurality of pages on the display device.

14. The system of claim 7, further comprising instructions that, when executed by the at least one processor, cause the system to determine that the at least one element belongs with the starting point of the primary text flow by determining a relative position of the at least one element to the starting point in the original presentation.

15. In a digital medium environment for defining pagination preferences to control pagination of dynamic-length presentations, a non-transitory computer readable medium storing instructions thereon that, when executed by at least one processor, cause the at least one processor to perform steps comprising:

identifying pagination preferences for each page of an original presentation, where the original presentation comprises a design for at least one page of the original presentation, the design comprising: (i) a primary text flow, and (ii) at least one element separate from the primary text flow for display on the at least one page;

identifying, for the at least one page of the original presentation, a starting point and an ending point within the primary text flow;

associating the at least one element with the starting point of the at least one page on which the at least one element is located in the original presentation based on metadata for the at least one page;

determining that display of the original presentation on a display device requires different pagination than display of the original presentation during authoring of the original presentation;

determining that the at least one element belongs with the starting point of the primary text flow on a first page on the display device based on the metadata; and displaying, on a display device, the at least one element with the starting point of the primary text flow on the first page and at least part of the primary text flow on a second page on the display device.

16. The non-transitory computer readable medium of claim 15, wherein identifying pagination preferences comprises selecting a role for each page from a group consisting of a fixed page, a movable page, an optional page and an expansion page.

17. The non-transitory computer readable medium of claim 16, wherein identifying preferences further comprises defining a fixed page by relative position within the original presentation.

18. The non-transitory computer readable medium of claim 15, wherein identifying preferences further comprises specifying a plurality of pages of the original presentation that are not to be separated during pagination or during display on the display device.

19. The non-transitory computer readable medium of claim 15, wherein associating the at least one element comprises recording a location of a first word in the primary text flow for a page on which the at least one element resides in the original presentation.

20. The non-transitory computer readable medium of claim 15, wherein the original presentation comprises a plurality of pages, the pages comprising metadata for controlling pagination of the original presentation on a display device of unknown size.

* * * * *